(No Model.)

O. B. JACOBS.
BEARING.

No. 505,107. Patented Sept. 19, 1893.

WITNESSES:
John F. Rennie
C. Sedgwick

INVENTOR
O. B. Jacobs
BY Munn & Co
ATTORNEYS.

UNITED STATES PATENT OFFICE.

OLAUS B. JACOBS, OF FREMONT, WASHINGTON.

BEARING.

SPECIFICATION forming part of Letters Patent No. 505,107, dated September 19, 1893.

Application filed December 7, 1892. Serial No. 454,387. (No model.)

*To all whom it may concern:*

Be it known that I, OLAUS B. JACOBS, of Fremont, in the county of King and State of Washington, have invented a new and Improved Bearing, of which the following is a full, clear, and exact description.

The invention relates to ball bearings, and its object is to provide a new and improved bearing which is simple and durable in construction, very effective in operation, and arranged to reduce the friction to a minimum.

The invention consists of certain parts and details and combinations of the same, as will be fully described hereinafter and then pointed out in the claims.

Reference is to be had to the accompanying drawings forming a part of this specification, in which similar letters of reference indicate corresponding parts in both the figures.

Figure 1:
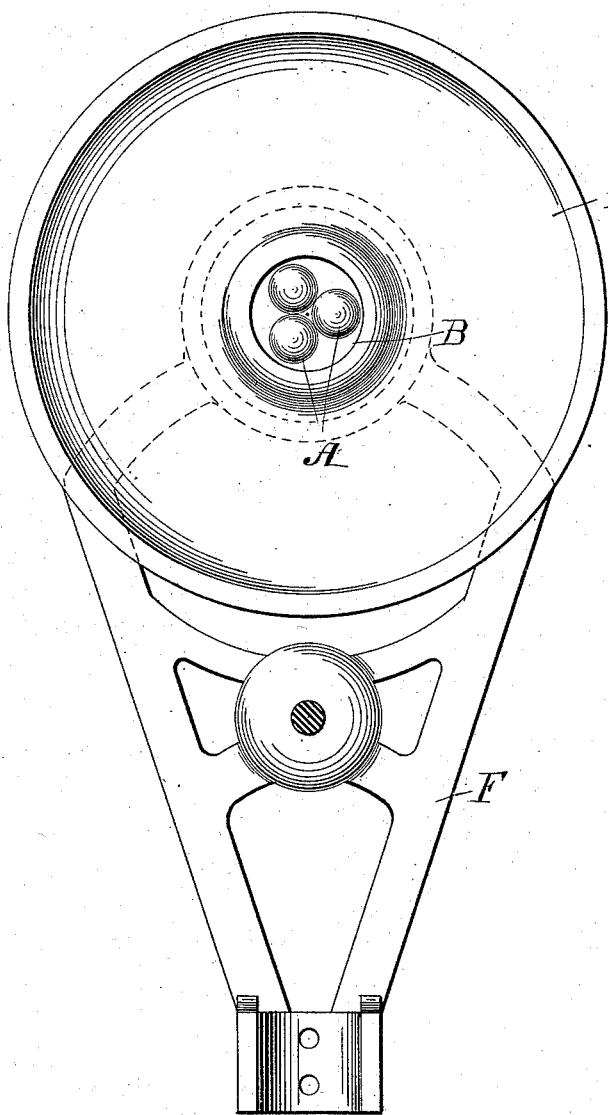
Figure 2:
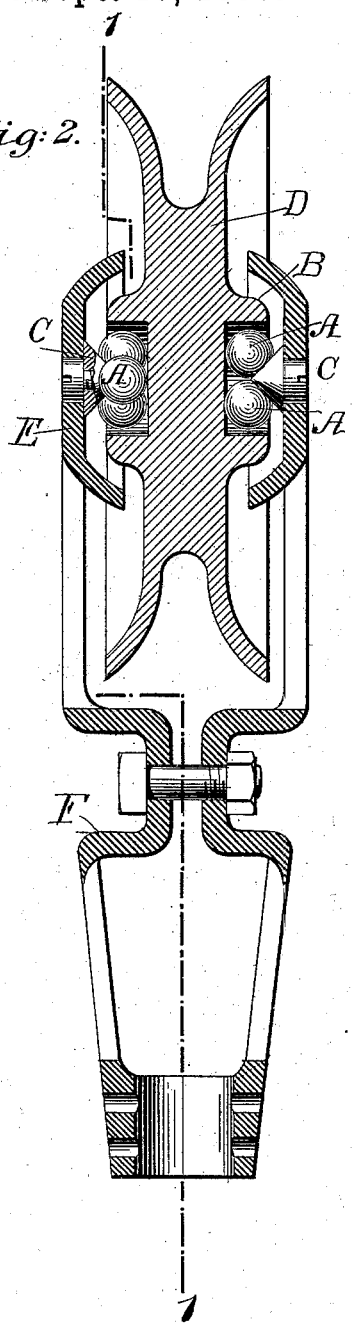

Figure 1 is a sectional side elevation of the improvement, on the line 1—1 of Fig. 2, as applied to a trolley pulley; and Fig. 2 is a transverse section of the same.

The improved bearing is provided with a series of balls A, preferably three in number and made of a suitable metal, said balls being arranged in cups B and engaged by cones C passing into the center of the balls, so that the latter engage with their peripheral surface the sides of the said cones as well as the inner wall of the cups B.

As shown in the drawings a cup B is formed in the hub of the trolley pulley D on each side, and a cone C is secured on each side E of the hanger F for the trolley pulley D. Now, it will be seen that when the pulley D is revolved the balls A held in the cup B engage the cones C, thus forming a bearing in which the friction is reduced to a minimum. The sides E of the hanger F are likewise cup-shaped as shown in Fig. 2, to protect the bearing from dust.

Having thus fully described my invention, I claim as new and desire to secure by Letters Patent—

1. In a bearing, the combination with a pulley provided with cups in its hub, and balls in said cups, of a hanger having cup-shaped sides into which the hub of the pulley projects, and cones projecting from the inside of the hanger and engaging the balls, substantially as described.

2. In a bearing, the combination with a pulley provided with cups in its hub, and balls in the said cups, of a hanger having cup shaped sides into which the hub projects, and cones detachably secured to the inner surface of the cup shaped sides of the hanger and engaging the balls, substantially as herein shown and described.

OLAUS B. JACOBS.

Witnesses:
WM. H. REEVES,
HENRY BINNIAN.